United States Patent [19]
Aoshima

[11] Patent Number: 4,760,577
[45] Date of Patent: Jul. 26, 1988

[54] CPM PULSE LASER DEVICE HAVING A FEEDBACK MEANS

[75] Inventor: Shinichiro Aoshima, Shizuoka, Japan

[73] Assignee: Hamamatsu Photonics Kabushiki Kaisha, Shizuoka, Japan

[21] Appl. No.: 7,645

[22] Filed: Jan. 28, 1987

[30] Foreign Application Priority Data

Jan. 28, 1986 [JP] Japan .................................. 61-16597

[51] Int. Cl.$^4$ ......................... H01S 3/13; H01S 3/098
[52] U.S. Cl. ......................................... 372/25; 372/21; 372/30; 372/53; 372/94; 356/350
[58] Field of Search ...................... 372/25, 21, 53, 92, 372/93, 94, 96, 98, 99, 11, 29, 30, 33, 18; 356/350

[56] References Cited

U.S. PATENT DOCUMENTS

| | | | |
|---|---|---|---|
| 4,468,775 | 8/1984 | Meyer et al. | 372/92 |
| 4,617,665 | 10/1986 | Mourou et al. | 372/94 |

FOREIGN PATENT DOCUMENTS 0214260 10/1984 Fed. Rep. of Germany ........ 372/25

OTHER PUBLICATIONS

Mak et al; "Unidirectional CW . . . Return Mirror"; Sov. Phys. Tech. Phys., vol. 19, No. 4; 10/1974; pp. 552–553.
Marowsky et al; "A Comparative . . . Ring Lasers"; IEEE Journal of Quantum Electronics; vol. QE-10, No. 11; 11/1974; pp. 832–837.
Ferrario; "A 13 MW Peak . . . 1.1 μm Range"; Optics Communications, vol. 30, No. 1; 07/1979; pp. 83–84.
Herman Vanherzeele, "Synchronously Pumped Dye Laser Passively Mode-Locked with an Antiresonant Ring," 12/84; pp. 4182–4183.
R. L. Fork, B. I. Greene, and C. V. Shank, "Generation of Optical Pulses Shorter than 0.1 psec by Colliding Pulse Mode Locking," 5/1/81; pp. 671–672.
L. F. Mollenauer and R. H. Stolen, "The Soliton Laser," 10/28/83; pp. 13–15.

Primary Examiner—William L. Sikes
Assistant Examiner—Xuan T. Vo
Attorney, Agent, or Firm—Finnegan, Henderson, Farabow, Garrett and Dunner

[57] ABSTRACT

A CPM pulse laser device is provided which has a means for emitting pulses in two separate directions. A return system is provided for returning one of the pulses to the laser resonator in such a manner that the returned pulse is superposed on the other pulse which was propagated in the other direction. The return system preferably includes a total reflecting mirror or a nonlinear crystal. The position of the total reflecting mirror or nonlinear crystal is precisely adjusted to create the superposition.

8 Claims, 3 Drawing Sheets 4,760,577

CPM PULSE LASER DEVICE HAVING A FEEDBACK MEANS

BACKGROUND

1. Field of the Invention

This invention relates to a colliding pulse mode-locked (CPM) pulse laser device having an optical return (feedback) stabilizing means.

2. Description of the Prior Art

In known CW ring laser devices a polygonal laser resonator optical path is formed by a plurality of reflecting mirrors. Amplifying media are inserted in the polygonal laser resonator optical path. A pulse laser device is formed by inserting a saturable medium in the laser resonator optical path of the CW ring laser. CPM operation was first performed in a dye laser.

A CPM ring dye laser device can generate an ultrashort laser beam. As explained in R. L. Fork et al, "Applied Physics Letter", Vol. 38, No. 9, pp. 671-2, an optical pulse shorter than 0.1 pico-second was produced with a CPM ring dye laser device.

To decrease the pulse width and to increase the output power of the pulse created by the CPM ring laser devices it is necessary to increase the concentration of the saturable absorbing dye and the intensity of the pumping energy, i.e., it is essential to change parameters of the laser device. However, it is difficult to adjust the concentration of the saturable absorbing dye, and it is also difficult to retore the concentration of the saturable absorbing dye which has been increased.

OBJECTS AND SUMMARY OF THE INVENTION

Accordingly, it is an object of this invention to provide a CPM pulse laser device which provides an optical pulse having a short width but having increased power.

More specifically, it is an object of this invention to provide a CPM pulse laser device in which a simple return system is employed so that the pulse width is decreased, the average output is increased, and the operation is stabilized.

The foregoing objects of the invention are achieved by providing a CPM pulse laser device which has a return system which returns an optical pulse that propagates in one direction from a laser resonator to the laser resonator in such a manner that the optical pulse is superposed on an optical pulse which propagates in the other direction in the laser resonator. The return system preferably includes a total refelecting mirror or a nonlinear crystal.

BRIEF DESCRIPTION OF THE DRAWINGS

The manner by which the above objects and other objects, features and advantages of the present invention are attained will become fully apparent from the description of the invention which follows, taken in conjunction with the following drawings, wherein like reference numerals denote like elements and wherein.

DETAILED DESCRIPTION OF THE INVENTION

The present invention will be described in detail with reference to the accompanying drawings which illustrate preferred embodiments of the invention.

Figure 1:
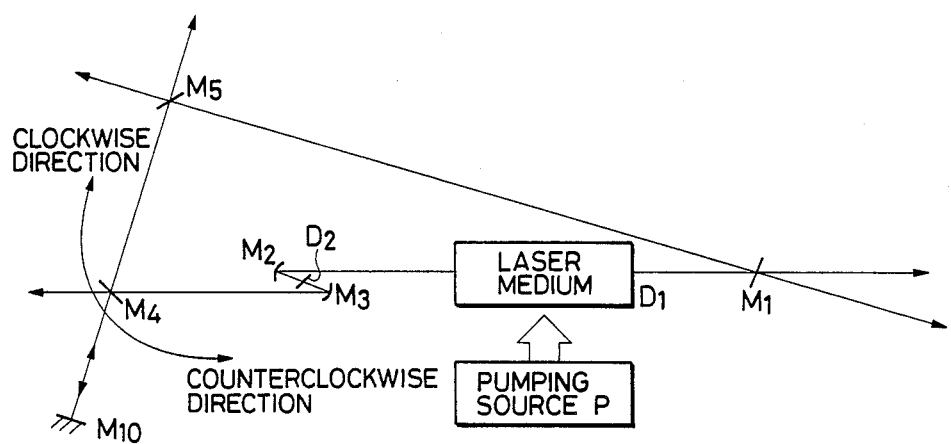
FIG. 1 is a block diagram showing a first embodiment of a CPM pulse laser device having optical feedback stabilizing means according to this invention.

In FIG. 1, a pumping source (P) is an energy source for exciting a laser medium $D_1$. The pumping source P is, for example, an argon ion laser light or the like when the laser medium is a dye, a Krypton arc lamp or the like when the laser medium is a solid material such as a YAG, and discharge current or the like when the laser medium is a gaseous material such as argon ion.

A saturable absorbing dye $D_2$ is arranged between saturable absorbing dye resonance reflecting mirrors $M_2$ and $M_3$.

Figure 2:
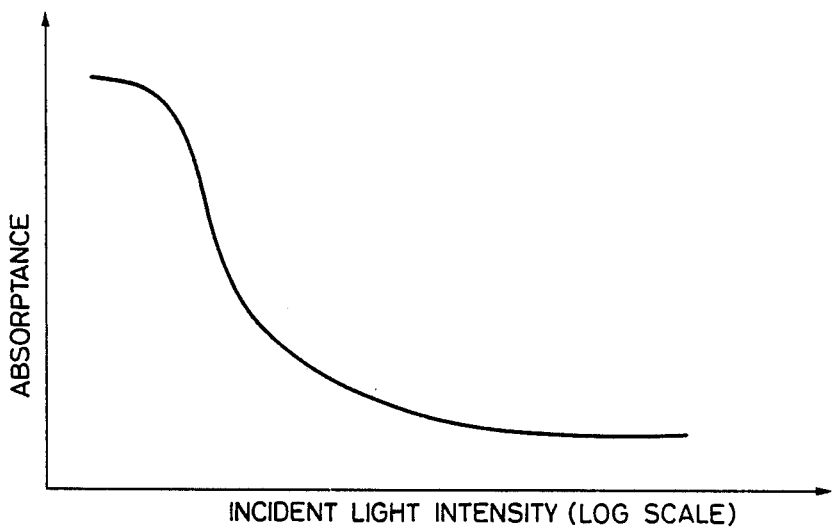
FIG. 2 is a graphical representation indicating the light absorption characteristics of a saturable absorbing dye suitable for use in the laser device shown in FIG. 1.

FIG. 2 is a graphical representation of the absorption characteristic of the saturable absorbing dye $D_2$. As is apparent from FIG. 2, the saturable absorbing dye $D_2$ has a high absorptance when the incident light intensity is low, and a low absorptance when the incident light intensity is high. By inserting a dye of this nature in a CW laser resonator, pulse oscillation is spontaneously effected in the CW laser.

Mirrors $M_1$, $M_4$, and $M_5$ in FIG. 1, are output mirrors as well as resonance reflecting mirrors. $M_{10}$ designates a total reflecting-mirror for forming a return system.

In the laser resonator, the optical pulse propagates in clockwise and counterclockwise directions from the saturable absorbing dye $D_2$. Two optical outputs are obtained at each of the output mirrors $M_1$, $M_4$, and $M_5$. An optical return system is formed to return an optical pulse propagating in a laser resonator, so as to superpose on the optical pulse which propagates in the opposite direction in the laser resonator.

Output mirrors $M_1$, $M_4$ and $M_5$ have two output light beams. Of the optical pulses which start from the dye $D_2$ at the same time, the clockwise pulse reaches the output mirror $M_4$ in a period of time of $l_1/c$ (where $l_1$ is the optical distance of from $D_2$ through $M_3$ to $M_4$, and c is the light velocity), while the counterclockwise pulse reaches the output mirror $M_4$ in a period of time of $(L-l_1)/c$ (where L is the total optical path length (or cavity length). The pulse repetitive frequency in the device is set to $c/L$.

The counterclockwise pulse from the output mirror $M_4$ is reflected by the reflecting mirror $M_{10}$, which is a distance $l_1$ from the output mirror $M_4$. This forms the return system, so that the counterclockwise pulse is returned after an optical delay of twice $l_1$.

The optical distance $l_1$ between the reflecting mirrors $M_4$ and $M_{10}$ is precisely adjusted, using a micrometer, for example, so that the mirror $M_{10}$ is positioned accurately. The optical pulse thus returned reaches the reflecting mirror $M_4$ a period of time of $(L+l_1)/c$ after the departure of the saturable absorbing dye $D_2$, as a result of which the optical pulse, being superposed on the following clockwise optical pulse, propagates in the resonator.

In a CPM ring dye laser device according to this invention, in which Rh6G (Rhodamine 6G) and DODCI (3,3'-Diethyl oxadicarbocyanine iodide) are employed as a laser medium $D_1$ and as a saturable absorbing dye $D_2$, respectively, the average output of the laser device is 1.1 to 2.5 times as high as a conventional CPM ring dye laser device having no feedback system. Further, the optical pulse width in the laser device of the invention is smaller (about 90% to 99%) than that in a conventional laser device. In addition, the oscillation is stable, and so-called "satellite pulses" (i.e., unwanted pulses which appear in the skirt of the necessary pulse having a repetitive frequency of c/L) are avoided. The transmissivity of the reflecting mirror $M_4$ is approximately 1% and the optical energy of the optical pulse re-entering the laser resonator is approximately $10^{-2}\%$ of the optical energy of the optical pulse in the laser resonator.

The remaining output mirrors $M_5$ and $M_1$ operate similarly.

Figure 3:
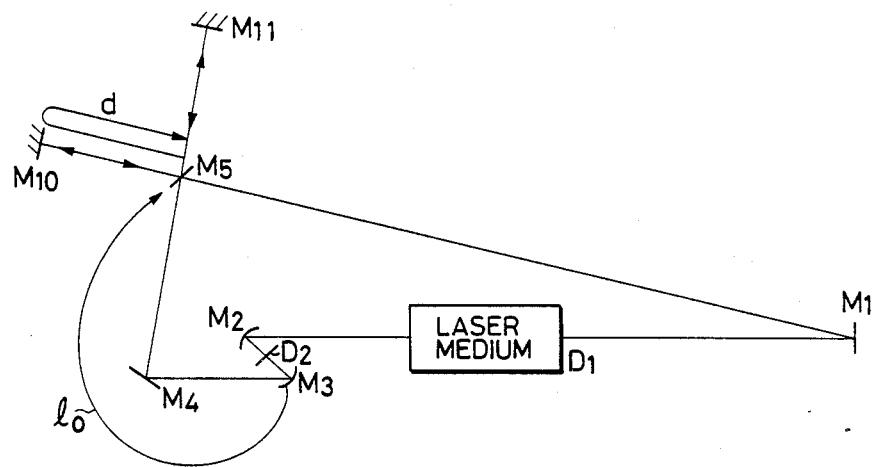
FIG. 3 is a block diagram showing a basic principle of optical pulse feedback according to this invention.

FIG. 3 depicts a method for determining an optical delay distance for optical pulse feedback. The clockwise optical distance between the saturable absorbing dye $D_2$ and an output mirror is represented by $l_0$ and L represents the resonator length (not shown). The periods for clockwise and counterclockwise pulses to travel from the saturable absorbing dye $D_2$ to the output mirror are $l_0/c$ and $(L-l_0)/c$, respectively, where c is the light velocity. An arbitrary output pulse is provided with an optical delay distance (d) and is subjected to feedback operation. When the feedback pulses of optical pulses propagating in one direction in the laser resonator are superposed on the optical pulses propagating in the other direction in the laser resonator, many optical delay distances (d) are provided. These are represented by equation (1) as follows:

$$d = nL \pm (L - 2l) > 0 \quad (1)$$

$(n = 0, 1, 2, 3, \ldots)$

The "+" sign in equation (1) applies the optical delay distance (d) for a clockwise pulse, and a "−" sign applies to the optical delay distance (d) for a counterclockwise pulse.

First optical pulses from the saturable absorbing dye $D_2$ propagate in the right (counterclockwise) and left (clockwise) directions inthe laser resonance as shown in FIG. 3. The optical pulses propagating in both directions travel around the laser resonator in a period of time of L/c and then collide with each other in the saturable absorbing dye $D_2$ to generate second optical pulses after a period of time of L/c. The second optical pulses also propagate in the right and left directions and collide with each other to generate third optical pulses after two periods, which propagate in the right and left directions. Nth optical pulses are similarly generated, where n represents an integer.

Accordingly, the integer n indicates that a feedback pulse of the first optical pulse propagating in one direction of the laser resonator can be superposed on the arbitrary nth optical pulse propagating in the other direction of the laser resonator by adjusting the optical delay distance. Further, values of n to satisfy the equation (2) cannot be used.

$$d \leq 0 \quad (2)$$

Figure 4:
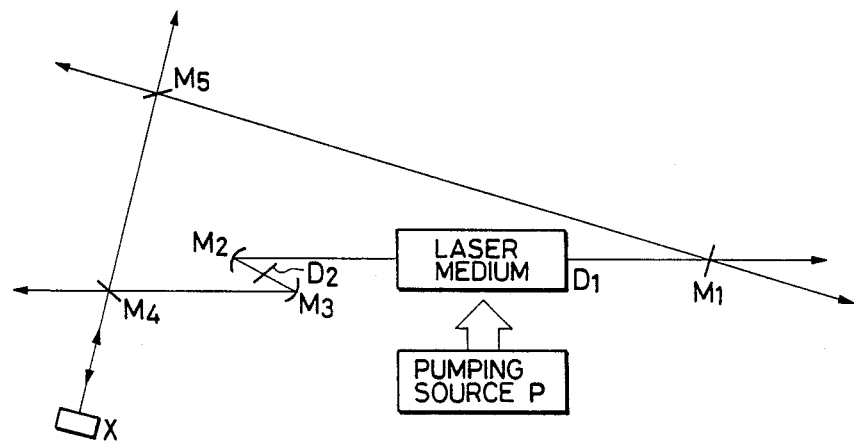
FIG. 4 is a block diagram showing a second embodiment of a CPM pulse laser device having optical feedback stabilizing means according to this invention.

FIG. 4 is a block diagram showing a second example of the CPM pulse laser device which has an optical return stabilizing means according to this invention.

The configuration of FIG. 4 is obtained by modifying the configuration of FIG. 1 so that a nonlinear crystal X is employed to form the return system in the laser device shown in FIG. 1 instead of the total reflecting mirror $M_{10}$. The remaining components are the same as those in FIG. 1 and are therefore designated by the same reference characters.

When a light beam is applied to the nonlinear crystal X (such as $BaTiO_3$), a light beam is produced which propagates in exactly the opposite direction (hereinafter referred to as "a phase conjugate light").

The delay time which elapses from the instant in time that a light beam is applied to the nonlinear crystal X until the phase conjugate light is produced is represented by $\eta$.

When, with respect to the counterclockwise pulse from the output mirror $M_1$, the nonlinear crystal X is disposed at a distance 1x from the output mirror $M_4$ to form a return system satisfying the following equation:

$$1x = c/2((2l_0 + nL)/c - \eta)$$

then the same effects as those in the first example shown in FIG. 1 can be obtained.

Figure 5:
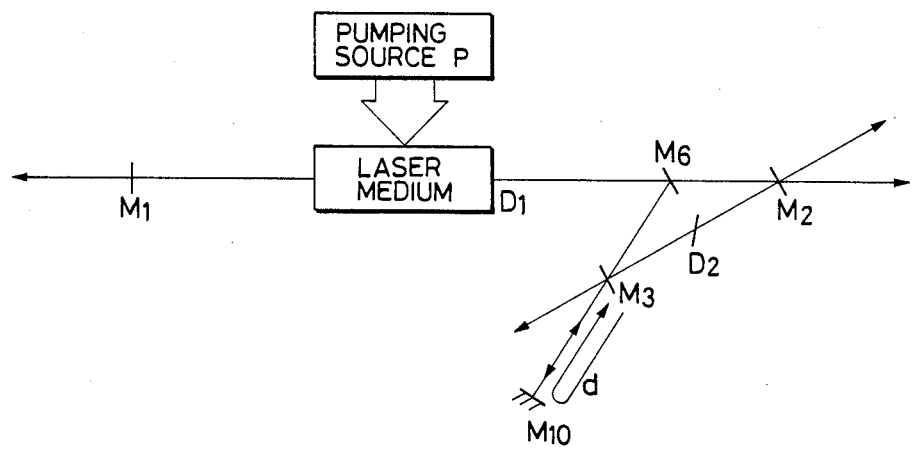
FIG. 5 is a block diagram showing a third embodiment of a CPM pulse laser device according to this invention.

FIG. 5 is a block diagram showing a third example of the CPM pulse laser device having optical feedback stabilizing means according to this invention. In this example, a portion of the laser resonator comprising $M_6$, $M_2$, $D_2$, $M_3$ and $M_6$ forms a ring structure. $M_6$ represents a half mirror, one surface of which is subjected to AR coating. An optical distance from $M_6$ through $M_2$ to $D_2$ is set to be equal to that from $M_6$ through $M_3$ to $D_2$. The optical pulses diverging from $M_6$ collide with each other at $D_2$, whereby the CPM effect occurs. If $L_1$ is the optical distance between $M_1$ and $M_6$, $L_2$ is the optical distance from $M_6$ through $M_2$ and $M_3$ to $M_6$, $l_1$ is the optical distance from $M_6$ through $M_2$ to $D_2$; and $l_0$ is the clockwise optical distance between $M_6$ and an output mirror ($M_2$ or $M_3$), then, $$l_1 = L_2/2, f_0 = c/2(L_1 + l_1)$$

wherein $f_0$ represents the pulse repetitive frequency. Assuming $L_0 = 2(L_1 + l_1)$, $$d = nL_0 \pm (L_2 - 2l_0) > 0,$$

$(n = 0, 1, 2, 3, \ldots)$, where d represents the optical delay distance in the optical feedback stabilizing means. A "+" sign in the above equation represents the optical delay distance of a clockwise pulse, a "−" sign a counterclockwise pulse, and an integer n indicates that an optical pulse in the resonator is superposed on the optical pulses propagating into the resonator after n periods lapse. Values of n satisfying the equation $(d \leq 0)$ cannot be used.

Figure 6:
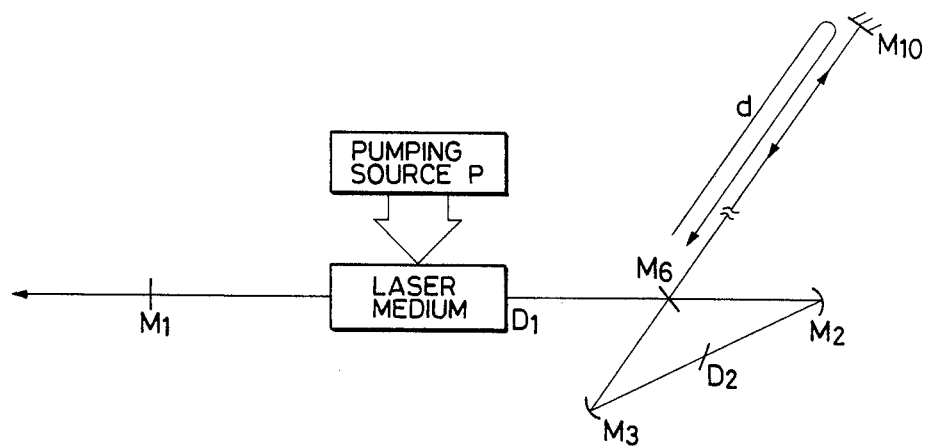
FIG. 6 is a block diagram showing a fourth embodiment of a PCM pulse laser device according to this invention.

FIG. 6 is a block diagram showing a fourth example of the CPM pulse laser device having an optical feedback stabilizing means. In this example, $d = 2L_1 + nL_0$, $(n = 0, 1, 2, 3, \ldots)$. The laser resonators in the embodiments as described above form triangular optical paths. However, this invention is not limited to the shape of the optical path. An arbitrary polygonal optical path can be used in a laser resonator according to this invention.

As described in detail above, the CPM pulse laser device according to this invention has a feedback system which returns the optical pulse which propagates in one direction from the laser resonator to the laser resonator in such a manner that it is superposed on the optical pulse which propagates in the other direction.

Accordingly, the CPM pulse laser device of the invention is higher in average output, shorter in optical pulse width and higher in oscillation stability (suppressing the generation of satellite pulses) than the conventional CPM pulse laser device having no feedback system.

While the preferred embodiments of the invention have been described, it is to be understood that the invention is not limited thereto but may be otherwise embodied within the scope of the following claims.

What is claimed is:

1. A colliding pulse mode-locked apparatus comprising:
    a pumping source;
    a laser medium pumped by said pumping source;
    a laser resonator, at least a portion of which forms a polygonal path, said laser resonator comprising a plurality of output mirrors functioning as output mirrors and resonance reflecting mirrors;
    a saturable absorbing dye positioned in said polygonal optical path so that a light from said laser medium passes therethrough, whereby a first and a second propagating pulse propagate in clockwise and the counterclockwise directions respectively from said saturable absorbing dye as a starting point of propagation and collide with each other in said saturable absorbing dye; and
    returning means for receiving and returning one of said first and said second propagating pulses to said laser resonator, to thereby superpose on the other of said first and second propagating pulses in said laser resonator.

2. The colliding pulse mode-locked pulse laser apparatus of claim 1, wherein said plurality of mirrors comprises first, second and third mirrors positioned so that said first propagating pulse is reflected in sequential order by said first, said second and said third mirrors, while said second propagating pulse is reflected in sequential order by said third, said second and said first mirrors.

3. The colliding pulse mode-locked pulse laser apparatus of claim 1, wherein the distance between said returning means and said output mirror confronting said returning means is adjustable to ensure said superposition of one of said first and second propagating pulses on the other of said first and second propagating pulses in said laser resonator.

4. The colliding pulse mode-locked pulse laser apparatus of claim 1, wherein said returning means includes a total reflecting mirror to produce a phase conjugate light.

5. The colliding pulse mode-locked pulse apparatus of claim 4, wherein said laser resonator further comprises a first total reflecting mirror and a second total reflecting mirror facing said first total reflecting mirror, said first total reflecting mirror reflecting said first propagating pulse through said saturable absorbing dye to said second total reflecting mirror and said second total reflecting mirror reflecting said second propagating pulse through said saturable absorbing dye to said first total reflecting mirror.

6. The colliding pulse mode-locked pulse laser apparatus of claim 1, wherein said saturable absorbing dye has a high absorptance when an incident intensity is low and a low absorptance when the incident intensity is high.

7. The colliding pulse mode-locked pulse laser apparatus of claim 1, wherein said returning means comprises a nonlinear crystal to produce a phase conjugate light.

8. The colliding pulse mode-locked pulse laser apparatus of claim 7, wherein said nonlinear crystal comprises $BaTiO_3$.

* * * * *